United States Patent [19]

Brady et al.

[11] 3,857,875

[45] Dec. 31, 1974

[54] SULFONYLDIALKANOIC ACID ESTERS OF 2,3-DIBROMO-1-ALKANOLS

[75] Inventors: Donnie G. Brady; Roy A. Gray; Richard C. Doss, all of Bartlesville, Okla.

[73] Assignee: Phillips Petroleum Company, Bartlesville, Okla.

[22] Filed: Sept. 28, 1972

[21] Appl. No.: 292,899

[52] U.S. Cl................ 260/481 R, 106/14, 252/8.1, 252/364, 260/78 R, 260/830 P, 260/348 A
[51] Int. Cl.......................................... C07c 147/02
[58] Field of Search ................................ 260/481 R

[56] References Cited
UNITED STATES PATENTS
| | | | |
|---|---|---|---|
| 2,536,498 | 1/1951 | Fraser | 280/481 R |
| 2,692,207 | 10/1954 | Blake | 260/481 R |
| 3,267,070 | 8/1966 | Tousignant et al. | 260/473 R |
| 3,501,514 | 3/1970 | Grimm et al. | 260/481 R |
| 3,644,442 | 2/1972 | Grimm et al. | 260/481 R |
| 3,676,469 | 7/1972 | Urry et al. | 260/473 R |

OTHER PUBLICATIONS

March, Adv. Org. Chem., McGraw–Hill Inc. N.Y., (1968), pages 357, 611.

Primary Examiner—Lorraine A. Weinberger
Assistant Examiner—John F. Terapane

[57] ABSTRACT

Dibromoalkyl esters of sulfonyldialkanoic acids useful as flame retardants.

2 Claims, No Drawings

SULFONYLDIALKANOIC ACID ESTERS OF 2,3-DIBROMO-1-ALKANOLS

This invention pertains to diallyl 3,3'-sulfonyldipropionate.

In another aspect, this invention pertains to diallyl 3,3'-sulfonyldipropionate, its halogen derivates and to an epoxy derivative thereof.

Organosulfones and allylsulfonylalkyl esters are known from such patents as U.S. Pat. No. 3,501,514 and U.S. Pat. No. 2,956,079, respectively. There has now been discovered the compound which is the subject of this invention, designated herein as diallyl 3,3'-sulfonyldipropionate, which compound is novel and can be employed in the production of various derivatives which are useful as flame retardants, solvents, and epoxy adhesive components.

The materials of this invention have the general formula

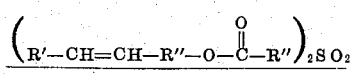

wherein R' is hydrogen or an alkyl group containing 1 to 4 carbon atoms, R'' is an alkylene radical of 1 to 4 carbon atoms, the radical being branched or linear, the radicals being the same or different, the total number of carbon atoms in the molecule being within the range of from about 10 to about 30.

One of the compounds of this invention, diallyl 3,3'-sulfonyldipropionate, has the general formula $$SO_2(CH_2CH_2CO_2CH_2CH=CH_2)_2.$$

Diallyl 3,3'-sulfonyldipropionate is a starting material for the production of the halogenated and epoxidized derivatives thereof.

The halogenated derivative has the general formula

ps wherein X is a halogen selected from the group consisting of bromine, chlorine, fluorine and iodine.

Bromine, chlorine, and iodine derivatives are employable as flame retardants in polymers of mono-alpha olefins such as homopolymers and copolymers of ethylene, propylene, and styrene. They are also useful in other polymers such as polyamides, polyurethanes and the like.

The fluorine derivative is employable as a solvent and reaction diluent.

Diallyl 3,3'-sulfonyldipropionate is also the starting material for the production of the epoxy derivative thereof, these glycidyl compounds having the general formula

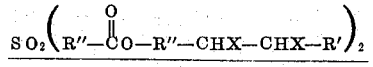

in which R' and R'' are as previously defined.

The glycidyl compounds can be employed in adhesive compositions and in protective coatings.

The diallyl compounds can be prepared by the oxidation of 3,3'-thiodipropionic acid, preferably with hydrogen peroxide to form the 3,3'-sulfonyldipropionic acid. This acid is then reacted with an alkali metal compound, preferably a potassium compound, to form an alkali metal salt of 3,3'-sulfonyldipropionic acid. The salt is then reacted with an allyl derivative, preferably allyl chloride, to form diallyl 3,3'-sulfonyldipropionate, An example of the formation of diallyl 3,3'-sulfonyldipropionate is given in the following example.

EXAMPLE I

To 0.1 g. mole of commercially available 3,3'-thiodipropionic acid in 100 ml glacial acetic acid was added 0.25 g. mole of hydrogen peroxide in a 30 percent aqueous solution. The mixture was agitated at about 28°C for about 1.5 hours after which it was refluxed for about 1 hour. The excess peroxide was then destroyed by the addition of 5 percent aqueous sodium sulfite.

The white, solid product was collected on a filter, washed with water and air dried to afford 18.7 g. (89 percent) of 3,3'-sulfonyldipropionic acid, m.p. 220°–229°C.

The potassium derivative was prepared by neutralization of the product with dilute potassium hydroxide followed by removal of the water, including drying in a vacuum oven at 120°C.

The potassium derivative, dipotassium 3,3'-sulfonyldipropionate, in the amount of 0.035 g. mole, allyl chloride in the amount of 0.109 g. mole and 0.004 g. mole of ethyl triphenylphosphonium bromide as catalyst were mixed in 50 ml. of 2-butanone as a solvent and the mixture was heated at 125°C. for three hours. After cooling to 28°C, the mixture was filtered. The potassium chloride thus separated was washed with 2-butanone and the washings were combined with the filtrate. The 2-butanone and the unreacted allyl chloride were removed at reduced pressure; 150 ml. of ether were added to the product mixture which was then washed with distilled water, dried over magnesium sulfate and filtered. The solvent was removed at reduced pressure to leave a white solid.

The white solid was recrystallized from a chloroform-hexane mixture to afford 5 g. of diallyl 3,3'-sulfonyldipropionate having a melting point of 58°–62'C.

That diallyl 3,3'-sulfonyldipropionate was the product was confirmed by elemental analysis, molecular weight determination and infrared absorption spectroscopy showing that the compound produced had the formula

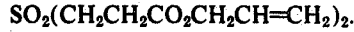

While the above procedure defines one method of preparing the compound concerned, various alternatives are employable.

For example, peracids, in general, such as perbenzoic acid, peracetic acid and inorganic oxidizing agents such as manganese dioxide, potassium periodate, and the like, can be substituted for hydrogen peroxide. Similarly, any alkali metal hydroxide, carbonate or bicarbonate can be employed in the neutralization step and quaternary phosphonium salts other than ethyl triphenyl phosphonium bromide can be employed in the esterification step.

The halogenated derivates having the general formula set forth above can be prepared by the method of the following example in which di(2,3-dibromopropyl) 3,3'-sulfonyldipropionate was prepared.

EXAMPLE II

A solution of bromine, 0.028 g. mole in 50 ml. of chloroform, was added over a period of 1.75 hours to a stirred, ice-cooled mixture of 0.014 g. mole of diallyl 3,3′-sulfonyldipropionate and 0.1 g. sodium bicarbonate in 75 ml. of chloroform.

The resulting mixture was stirred for an additional two hours after which it was washed with aqueous sodium bisulfite, aqueous sodium bicarbonate and distilled water. The chloroform solution was dried over magnesium sulfate and the solvent was removed at reduced pressure. The solid residue was recrystallized from a chloroform-hexane mixture affording 6.9 g. of a white crystalline solid having a melting point of 84°–86°C.

Upon analysis, this compound was shown to have the formula $$SO_2(CH_2CH_2CO_2CH_2CHBrCH_2Br)_2$$

and the following analysis:

| Component, Weight % | Calculated | Determined |
|---|---|---|
| Carbon | 23.6 | 24.0 |
| Hydrogen | 2.97 | 2.98 |
| Bromine | 52.4 | 51.9 |
| Sulfur | 5.3 | 5.8 |
| Molecular Weight | 610 | 593 |

While the above defines a specific procedure of preparing the bromine derivative, other halogenated derivatives can be produced by recognized techniques.

The chlorine, iodine and bromine derivative compounds of this invention are employed by themselves or in mixtures with each other as flame retardants as mentioned.

The above halogenated derivative compounds are employed as flame retardants in combination with antimony trioxide in amounts such that the weight ratio of the halogenated compound to the antimony trioxide is in the range of 1 to 1 to about 5 to 1 with about 1 to about 15 parts of the mixture being employed per hundred parts of the polymer. Compounds other than antimony trioxide can be employed, these compounds including zinc borate, bicumyl and the like.

The halogenated derivative is incorporated in the polymer in the usual manner and the polymer can contain the usual pigments, fillers, plasticizers and the like.

The effectiveness of the di(2,3-dibromopropyl) 3,3′-sulfonyldipropionate as a flame retardant is illustrated in the following:

Into 100 parts by weight of a commercial polypropylene there were incorporated a flame retardant mixture comprising 5 parts of di(2,3-dibromopropyl) 3,3′-sulfonyldipropionate and 2.5 parts of antimony trioxide. The effectiveness of the mixture as a flame retardant, as determined by the limiting oxygen index method (C. P. Fenimore and F. J. Martin, Modern Plastics, 43, 141, Nov. 1966) and ASTM D 635, is indicated in terms of the limiting oxygen index, LOI, defined as the minimum volume of oxygen required in an oxygen-nitrogen atmosphere to sustain burning of the test sample. Results were as follows:

| Flame Retardant Concentration* | $Sb_2O_3$* | LOI |
|---|---|---|
| 0 | 2.5 | 0.18 |
| 5 | 2.5 | 0.242 |

*In parts per 100 parts polymer (by weight)

Inasmuch as an LOI value of 0.235 is considered acceptable, it will be seen that the compound of this invention is a satisfactory flame retardant.

The epoxy derivative in the form of diglycidyl 3,3′-sulfonyldipropionate can be prepared as follows.

EXAMPLE III

A solution of m-chloroperbenzoic acid (11.4 g. of 85 percent, 0.056 mole) in 150 ml. of chloroform was added over a period of 4.5 hours to an ice-chilled solution of diallyl 3,3′-sulfonyldipropionate (0.0289 mole) in 75 ml. of chloroform. The resulting solution was allowed to stand about 12 hours at about 28°C. The solution was then refluxed for seven hours and thereafter allowed to stand for about 40 hours at about 28°C. The mixture was then cooled in ice and filtered.

The filtrate was washed with aqueous bisulfite until negative to starch-iodide paper. The filtrate was then washed with aqueous sodium bicarbonate and with distilled water after which it was dried over magnesium sulfate, filtered and the solvent was removed. The resulting residue was recrystallized from a chloroform hexane mixture to yield 6 g. of a white solid, mp 87°–88°C.

The compound had the formula

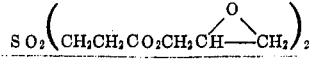

and the following analysis:

| Element, Weight % | Calculated | Determined |
|---|---|---|
| Carbon | 44.7 | 44.4 |
| Hydrogen | 5.6 | 5.5 |
| Sulfur | 9.9 | 10.1 |

While the above illustrates one method of preparing the compound concerned, various alternatives can be employed.

The diglycidyl 3,3′-sulfonyldipropionate is employable as a component of an epoxy adhesive as illustrated by the following.

The diglycidyl compound, in an amount of 0.8 g., was combined with 0.75 g. of a commercially available polyamide, Versamid 140. The mixture, when applied to clean aluminum coupons and cured, possessed lap shear strengths of between 1,100 and 1,950 psi.

The diglycidyl compound is also employable in protective coatings. For example, 0.8 g. of the diglycidyl compound in methylene chloride combined with 0.69 pentaerythritol tetra-3-mercaptopropionate and 0.6 g. of tris(2,4,6-dimethylaminomethyl)phenol was applied to a steel panel and cured. The resulting coating had a pencil hardness of H and a reverse impact strength of about 45 in. lbs.

While diallyl 3,3′-sulfonyldipropionate has been shown to be a satisfactory starting material for the brominated and epoxidized materials discussed above, various analogs of the same general formulae can be prepared, these compounds including diallyl 2,2'-sulfonyldiacetate, di(3-pentenyl) 3,3'-sulfonyldipropionate, di(2-pentenyl) 4,4'-sulfonyldi([3-methyl]butyrate), di(2,6-dimethyl-4-heptenyl) 3,3'-sulfonyldipropionate and di(5-decenyl) 5,5'-sulfonyldivalerate, and others.

It will be evident from the foregoing that various modifications can be made to the method of this invention. Such are considered, however, to be within the scope of the invention.

What is claimed is:

1. A compound of the formula $$\left( R'-CHX-CHX-R''-O-\overset{O}{\underset{\|}{C}}-R'' \right)_2 SO$$

wherein X is bromine, wherein R' is hydrogen or an alkyl group containing 1 to 4 carbon atoms, and R'' is an alkylene radical of 1 to 4 carbon atoms, said radicals being branched or linear, said radicals being the same or different, the total number of carbon atoms in said compound being within the range of from about 10 to about 30.

2. A compound of the formula of claim 1 which is di-(2,3-dibromopropyl)3,3'-sulfonyldipropionate.

* * * * *